Figure 9:
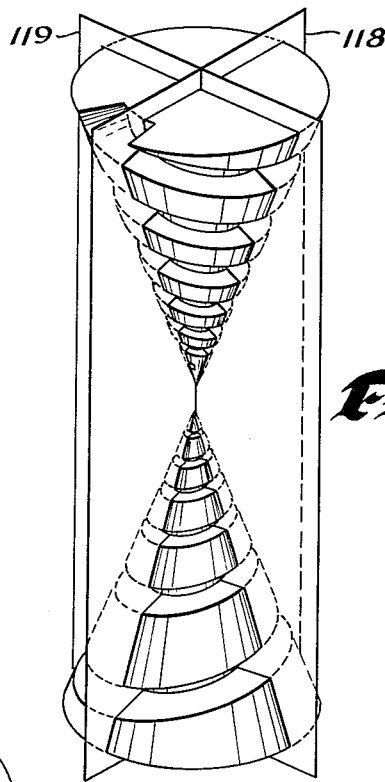

Feb. 26, 1963   R. H. DU HAMEL ET AL   3,079,602
LOGARITHMICALLY PERIODIC ROD ANTENNA
Filed March 14, 1958   9 Sheets-Sheet 1
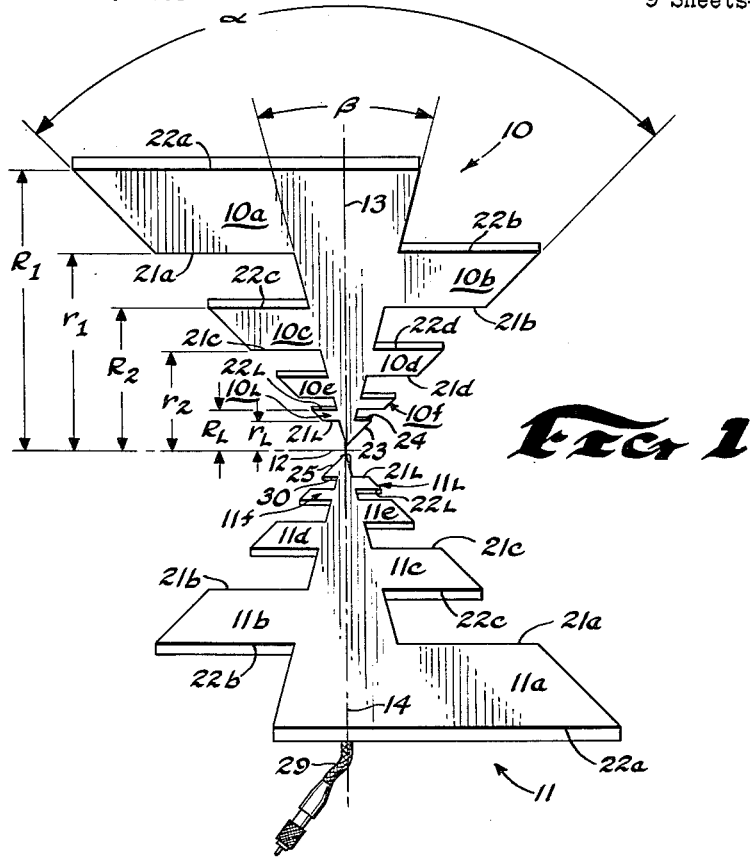
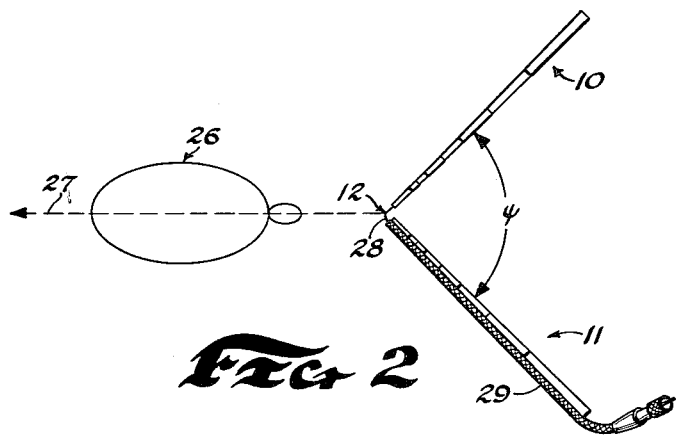
INVENTORS
RAYMOND H. DuHAMEL
FRED R. ORE
BY Moody and Goldman
ATTORNEYS

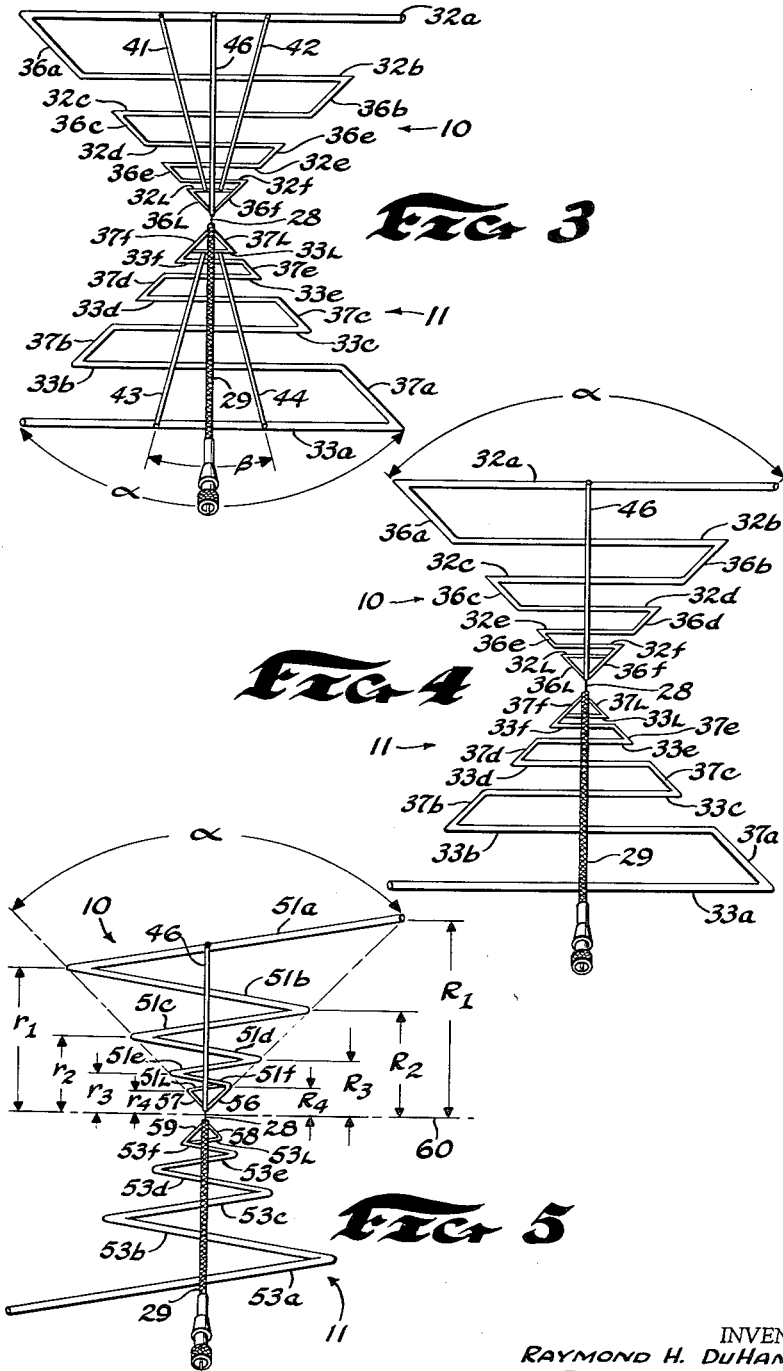

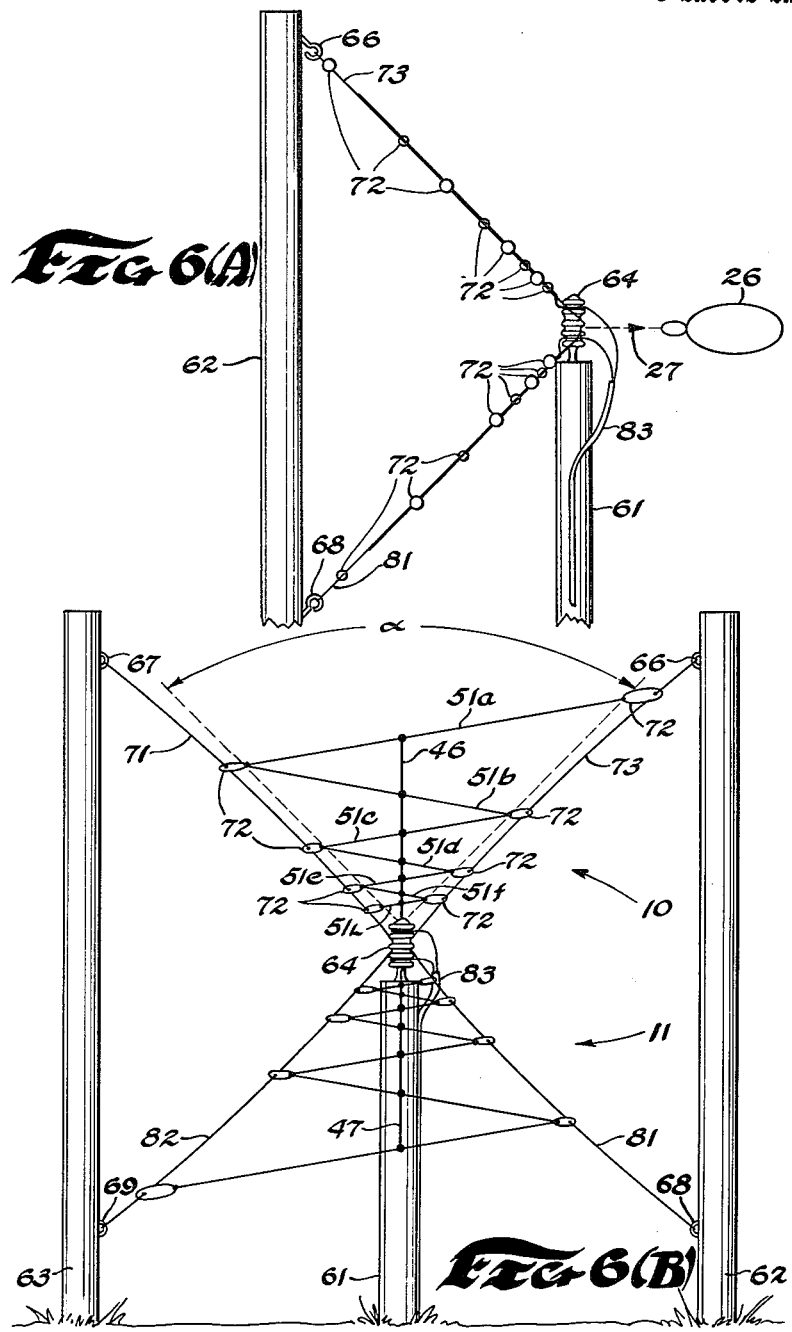

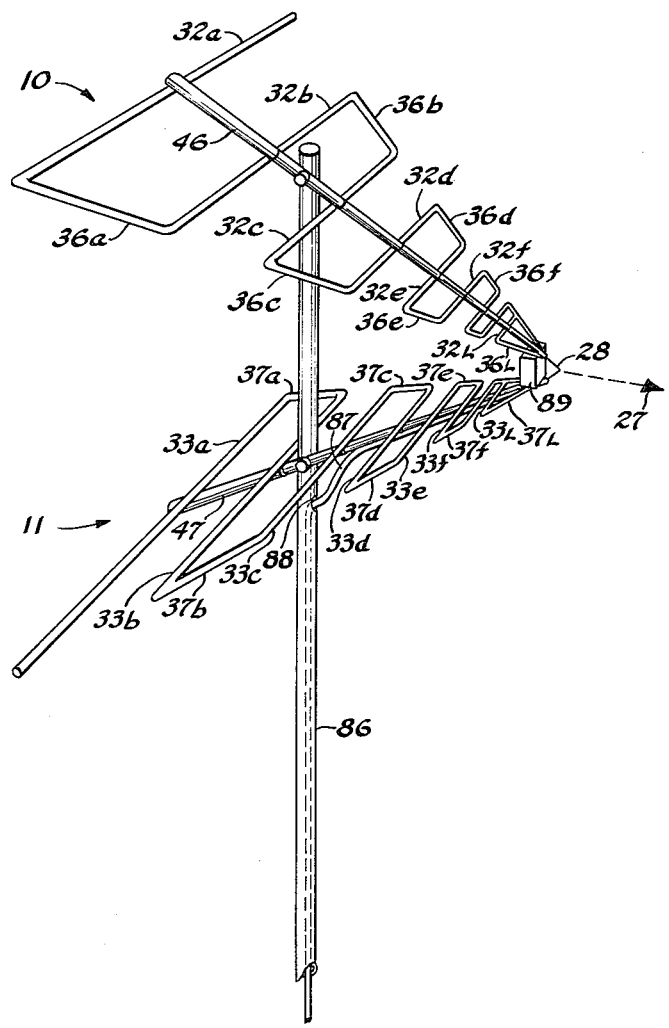

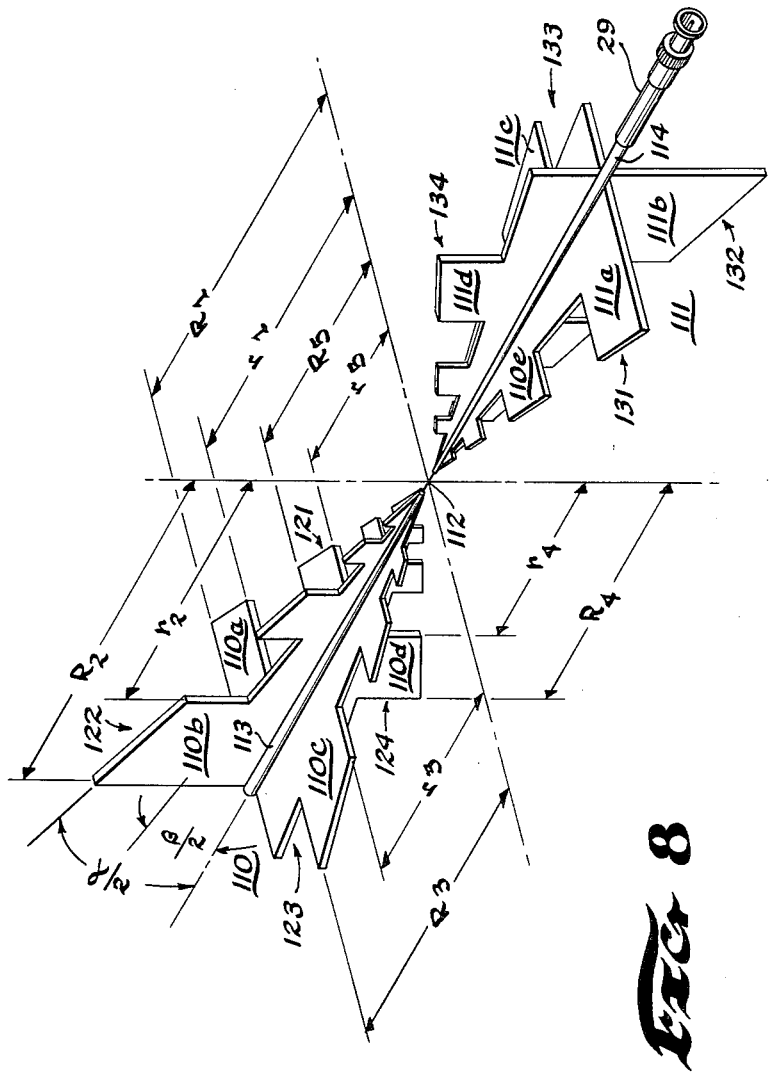

Feb. 26, 1963  R. H. DU HAMEL ET AL  3,079,602
LOGARITHMICALLY PERIODIC ROD ANTENNA
Filed March 14, 1958  9 Sheets-Sheet 6

INVENTORS
RAYMOND H. DuHAMEL
FRED R. ORE
BY Woody and Goldman
ATTORNEYS

Feb. 26, 1963   R. H. DU HAMEL ET AL   3,079,602
LOGARITHMICALLY PERIODIC ROD ANTENNA
Filed March 14, 1958   9 Sheets-Sheet 7
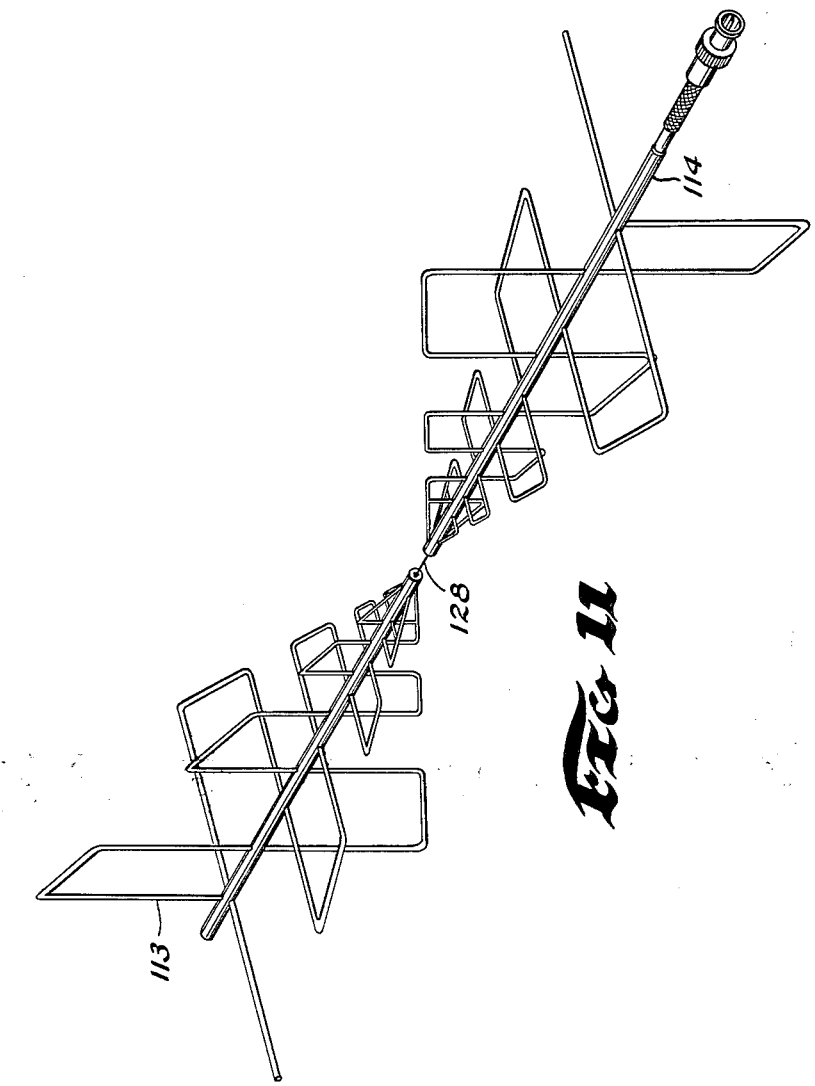
INVENTORS
RAYMOND H. DuHAMEL
FRED R. ORE
BY Moody and Goldman
ATTORNEYS

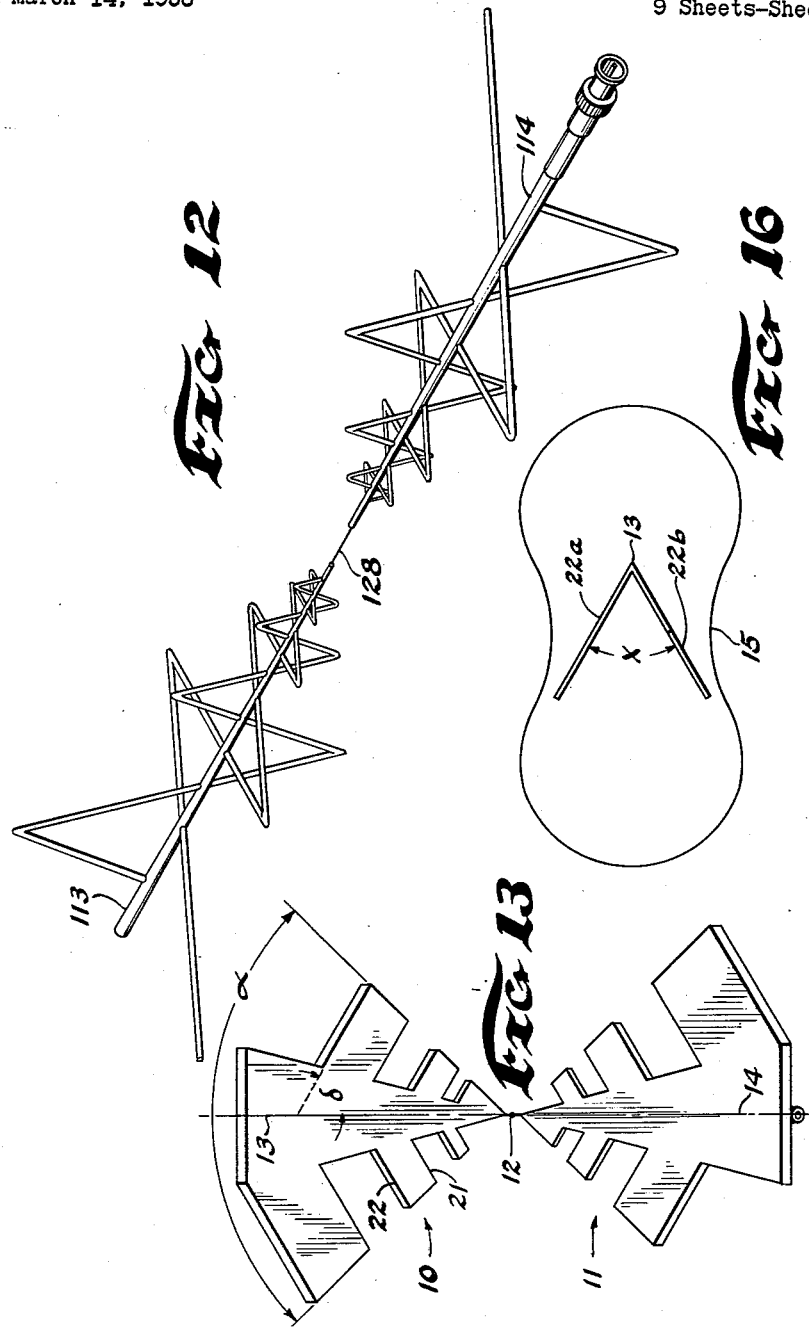

United States Patent Office 3,079,602
Patented Feb. 26, 1963

3,079,602
LOGARITHMICALLY PERIODIC ROD ANTENNA
Raymond H. Du Hamel and Fred R. Ore, Cedar Rapids, Iowa, assignors to Collins Radio Company, Cedar Rapids, Iowa, a corporation of Iowa
Filed Mar. 14, 1958, Ser. No. 721,408
14 Claims. (Cl. 343—908)

This invention relates to antennas of a type that can be described as logarithmically periodic, since their structure is repetitive in a logarithmic manner. Such antennas are particularly useful because they are capable of maintaining substantially-fixed radiation patterns and input impedances over a very broad frequency range, which may be greater than ten-to-one.

The general subject of such antennas is treated in a paper by R. H. DuHamel and D. E. Isbell, titled "Broadband Logarithmically Periodic Antenna Structures" and is found in the 1957 I.R.E. National Convention Record, Part I, of the group on Antennas and Propagation, Microwave Theory and Techniques. This article is only concerned with planar logarithmically periodic antennas which comply with the complementary principle when they are infinitely extended. The complementary principle requires that the same form be obtained when the antenna structure is interchanged with the planar space surrounding it. That is, the complementary principle requires that when an antenna and its complement are added together a complete infinite screen is obtained. In many situations, if an antenna has a complementary shape, it may be rotated by 90° about its center, and it will fill the area previously existing between its elements. If an antenna is identical to its principle it has a constant impedance of $60\pi$ ohms which is independent of frequency. This is explained in an article by V. H. Rumsey titled "Frequency Independent Antenna" found in the same I.R.E. records as the first-mentioned article. It was previously believed that the complementary principle must be adhered to in order to obtain a constant antenna input impedance independent of frequency.

The present invention deviates from the complementary principle in several ways and yet is able to maintain a radiation pattern and input impedance that are very nearly independent of frequency over a very broad range. For example, antenna structures made according to this invention need not lie in a single plane, which is a requirement of the complementary principle. Furthermore, when a form of the invention is made to lie in a single plane, it need not satisfy the complementary principle. The invention teaches how a logarithmically periodic antenna structure can be made entirely with a straight-lined configuration.

The invention provides a structure that is logarithmically periodic from a given vertex point. As a consequence, similar portions of the antenna repeat with a geometric-progression relationship as a function of their distance from the vertex. Transverse construction lines in the invention can be made linear to permit substantial structural simplifications, particularly for large sized antennas to extend their range to relatively low frequencies.

Some of the objects of this invention are the following:
To provide an antenna which maintains the same radiation pattern throughout an extremely large operating frequency range;
To provide an antenna which maintains a very-nearly constant input impedance over an extremely large frequency range;
To provide a logarithmically periodic antenna with a radiation pattern that can be made omnidirectional;
To provide a logarithmically periodic antenna with a radiation pattern that is controllably asymmetric;
To provide logarithmically periodic antennas having structural simplicity, while permitting frequency independence of radiation pattern and input frequency over extremely broad frequency ranges; and
To provide a logarithmically periodic antenna which can be entirely made of straight-lined structure, capable of easy fabrication from wire or rods.

Figure 10A:
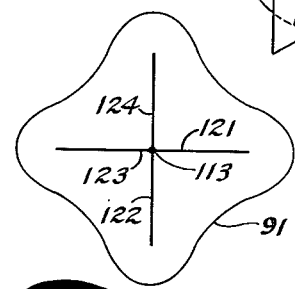
Figure 14A:
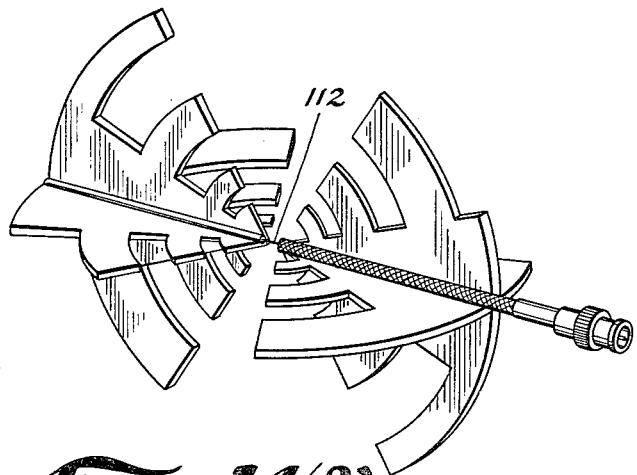
Figure 15:
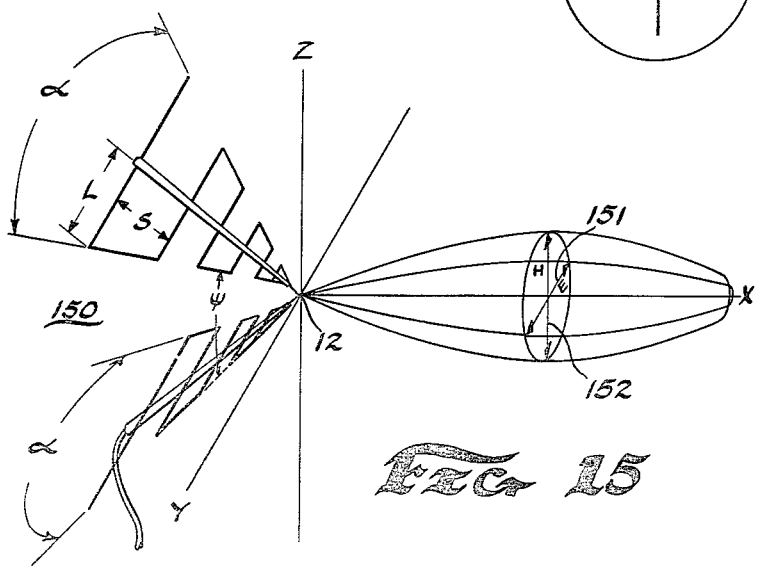

Further objects, features and advantages of the invention will become apparent to a person skilled in the art upon further study of the specification and accompanying drawings, in which:

FIGURE 1 illustrates an elevational view of one form of the invention;
FIGURE 2 shows a side view and radiation pattern;
FIGURES 3, 4, 5, 6(A), 6(B) and 7 represent other forms of the invention;
FIGURE 8 is a perspective of a three-dimensional form of the invention;
FIGURE 9 illustrates a conical development of the three-dimensional form in FIGURE 8;
FIGURES 10(A), (B) and (C) show end views of various forms of the invention with their radiation patterns;
FIGURES 11 and 12 show perspectives of other three-dimensional forms of the invention;
FIGURE 13 provides a modification of the invention;
FIGURES 14(A) and (B) respectively illustrate a rounded-tooth three-dimensional form, and its end view and radiation pattern;
FIGURE 15 represents a radiation pattern; and
FIGURE 16 shows an end view of a center-line folded antenna.

Now referring to detailed forms of the invention, FIGURE 1 is first considered. It shows a back-elevational view of an antenna made from a pair of metal sheets having a thickness that tapers toward a terminal point 12. FIGURE 2 shows a side view of the same antenna and orients the position of point 12, which is a reference point for the system but has no structural existence. The antenna includes half-portions 10 and 11 which are generally triangular in shape and have respective vertexes adjacent to point 12. Each half-portion 10 or 11 encompasses an angle $\alpha$ which is bisected by a center line 13 or 14, respectively, passing down their center. However, it is to be noted that neither half-portion 10 nor 11 is symmetrical about its center line.

Each half-portion 10 or 11 has transverse teeth extending on opposite sides of an inner triangular-shaped segment that is defined by an angle $\beta$. Angle $\beta$ is symmetrically placed within angle $\alpha$.

The two planes of half-portions 10 and 11 are oriented apart by an angle $\psi$, which can vary from 180° to 0°, increasing angle $\psi$ beyond 180° causes it to repeat.

A plurality of teeth 10a, 10b through 10L are formed on half-portion 10; and a similar plurality of teeth 11a, 11b through 11L are formed on half-portion 11. In FIGURE 1, each of the teeth is trapezoidal in form when its transverse parallel sides are extended to meet center-line 13 or 14; and the parallel sides are perpendicular to their center-line. The teeth vary in size and spacing in a logarithmically periodic manner from terminal point 12. Thus, each tooth has parallel sides 21 and 22 with outer side 22 being the more distant of the two from point 12. Each tooth is bounded on its remaining two sides by lines defining angles $\alpha$ and $\beta$.

The location and size of the set of teeth of half-portion 10 on the left side of its center line 13 will first be defined. The location and size of the remaining teeth of the antenna can then be defined in terms of this set of teeth. The distances along center line 13 between point 12 and the outer sides 22 of alternate teeth 10a, 10c through 10L are represented by distances $R_1$, $R_2$ through $R_L$. Any two consecutive values of $R$ are $R_N$ and $R_{N+1}$, with the latter being the smaller distance. Similarly, $r_1$, $r_2$ through $r_L$ represent distances of the inner sides of the same teeth from point 12; and of any consecutive pair of $r$ are $r_N$ and $r_{N+1}$, with the latter being the smaller distance. They are defined by the following expression:

$$\tau = \frac{R_{N+1}}{R_N} = \frac{r_{N+1}}{r_N} \quad (1)$$

where $\tau$ is a constant less than one, which is fixed for a given antenna design.

Expression 1 positions the teeth with respect to each other along the center-line but does not specify the width of the teeth. The width of any tooth of the set is the difference between $R_n$ and $r_n$, which are related by the following expression:

$$\sigma = \frac{r_N}{R_N} \quad (2)$$

where $\sigma$ is constant for a given antenna design.

Consequently, expression 2 completes the general definition of the set of teeth on the left side of center-line 13 in FIGURE 1.

The remaining teeth of antenna half-portion 10 can then be defined, because the teeth on the right-hand side of center-line 13 have their sides 22 and 21 aligned with the defined sides 21 and 22 respectively of the left-hand side, with the teeth on the right-hand side aligning with spaces between teeth on the left-hand side.

Furthermore, the teeth on the opposite antenna half-portion 11 are also thereby defined, because half-portions 10 and 11 are identically shaped. Thus, in FIGURE 1 the teeth on the right-hand side of portion 11 correspond to the teeth on the left-hand side of portion 10. Likewise, the teeth on the left-hand side of portion 11 correspond to the teeth on the right-hand side of portion 10.

Although the half-portions 10 and 11 are constructed in the same manner, they are positioned unsymmetrically with respect to each other in the sense that one is not the image of the other. This prevents the same antenna response from being obtained by positioning a single half-portion over a ground-plane that bisects angle $\psi$.

Expressions 1 and 2 determine a geometric-ratio sequence for tooth sizing and for tooth spacing. However, they permit different geometric-sequencies having the same geometric-ratio to define distances to inner and outer sides of a tooth, respectively. A particularly useful special case occurs when the teeth are similarly proportioned on opposite sides; and this is obtained when $$\sigma = \sqrt{\tau} \quad (3)$$

When angle $\psi$ is less than 180°, an asymmetrical radiation pattern 26 shown in FIGURE 2 is obtained, with the major lobe pointing in the direction of arrow 27. The primary polarization of the radiation is parallel to teeth sides 21 and 22. A secondary transverse polarization is also obtained, which is small and can be controlled. The radiation pattern is discussed below in more detail.

Theoretically, an infinite bandwidth from zero to infinite cycles-per-second can be obtained for the antenna by making each half-portion infinitely long, wherein the teeth become infinitely small as vertex 12 is approached and infinitely large in the opposite direction. In practice, finite dimensions are mandatory, and a finite number of teeth must be used. Thus, the bandwidth is then no longer infinite, but nevertheless, extremely large bandwidths can still be obtained. The number of teeth used in the given antenna is therefore somewhat arbitrary, although generally speaking more than two teeth must be used to obtain a structure which is logarithmically periodic. In each case, there is a practical limit to the size of the largest tooth, and the smallest tooth also has its limit. Thus, in antenna half-portion 10 in FIGURE 1, tooth 10L is the smallest, and tooth 10a is the largest. Accordingly, the small triangular part 23 of half-portion 10 near vertex 12 has no teeth, due to the practical difficulties in making very small teeth. However, the outer side 24 of triangular portion 23 performs like the outer side 22 of a tooth, and it acts electrically like the smallest tooth of the antenna.

Half-portion 11 similarly has a small triangular portion 25 with an outer side 30 that corresponds to triangular part 23 and its outer side 24, respectively.

Structurally, the size of the largest and smallest teeth determine the lowest and highest frequency limits, respectively, of the range.

The high-frequency limit of the frequency independent range is reached when the length of smallest side 24 or 25 from the center-line to its $\alpha$-boundary becomes about one-tenth of a wavelength of the radiated frequency.

On the other hand, the low frequency limit of the range is determined when the length of the largest side 22a, measured from center-line 13 to its $\alpha$-boundary, is approximately one-quarter wavelength.

Although the frequency limits are determined by the sizes of the largest and smallest teeth in the structure, it is by no means to be implied that radiation occurs only from these teeth at the respective frequency limits. Rather, radiation at all times occurs from several of the teeth in varying degrees in a complex manner.

Ideally, the sheets of metal from which each of the antenna half-portions 10 and 11 is made have tapered thickness as explained above. In practice, however, it has been found that stepped thickness can be used to the same effect; and further that uniform thickness can be used without substantially inhibiting the operation of the antenna for very large bandwidths of the order of five-to-one.

The antenna of FIGURE 1 can be fed by means of either a balanced or an unbalanced line, but special precautions must be taken to prevent the line from interfering with the radiation pattern. An unbalanced line, coaxial cable 29, is used in FIGURES 1 and 2. In order to prevent it from interfering with the radiation pattern, it is brought along the solid triangular portion within angle $\beta$, with the outer conductor making contact therewith, and it terminates at the apex of half-portion 11. Its inner conductor 28 extends from the end of coaxial line 29 across the space between the apexes of the half-portions, and connects to the apex of half-portion 10. Outer conductor 29 is not at ground potential along half-portion 11 but varies in a manner that automatically transduces the unbalanced-line impedance to a balanced impedance connection for the antenna without unbalancing the antenna pattern. The near-zone electro-magnetic fields associated with the antenna decrease rapidly as extremity 22a is approached. Therefore, the presence of coaxial line 29 has little effect on the field and hence on the balance of the antenna structure. This effectively produces a very wide-band balanced feed for the antenna.

Also, a balanced line can be connected to the antenna by being brought toward the antenna in FIGURE 2 along the direction of arrow 27, with opposite sides of the line being connected to the apexes of the respective half-portions. If the transmission line is brought from the side of the antenna that is perpendicular to the paper at point 27 in FIGURE 2, it interferes with the radiation pattern to some degree, which in many cases makes such type of connection undesirable.

Although each half-portion 10 and 11 is in a respective plane in FIGURES 1 and 2, each can also be folded about its center-line 13 and 14. FIGURE 16 shows an end view of such antenna where $\psi$ is 180° and $x$ is the fold angle between the radical members of half-portion 10 having respective end teeth 22a and 22b. The figure-eight type radiation pattern 15 of this antenna is made more omnidirectional as angle $x$ is made smaller. Optimum omnidirectionality is obtained with $x$ between 120° and 130°. As angle $x$ is made smaller the antenna becomes more frequency-sensitive and its bandwidth decreases.

We have also discovered structural modifications of the antenna given in FIGURES 1 and 2, which greatly facilitate the use of the invention. FIGURES 3 through 7 illustrate such modifications, and teach how the invention can be constructed from conducting rods or wire, while still maintaining the required operating characteristics of the invention. With regard to FIGURE 3, rods are used to provide an outline of the configuration given in FIGURE 1. Although the antenna of FIGURE 1 does not have an identical complementary structure, it still provides a clear distinction between the teeth and spaces between the teeth. The structure of FIGURE 3 is hence even farther from the complementary principle, since the internal portion of any tooth defined by rods or wire is also a space. Nevertheless, we have experimentally determined that the structure of FIGURE 3 operates in substantially the same manner as the structure of FIGURE 1.

FIGURE 3 also includes two half-portions 10 and 11. Half-portion 10 includes a plurality of transverse rods 32a, 32b through 32L. Similarly, half-portion 11 comprises transverse rods 33a, 33b through 33L. The rods of half-portion 10 are positioned with respect to the center of the antenna in the same manner as tooth sides 21 and 22 were located in FIGURE 1, that is, by means of expressions 1 and 2 above. Rod sections 36a, 36b through 36L are placed on the boundary of the teeth of portion 10, as defined by angle $\alpha$. Similarly, the teeth in portion 11 have lateral bounds provided by rod sections 37a, 37b through 37L, which likewise are aligned along angle $\alpha$. A pair of rods 41 and 42 are fixed to portion 10 along the sides of angle $\beta$; and rods 43 and 44 are similarly positioned in portion 11. A centrally positioned rod 46 is also provided along half-portion 10, while coaxial cable 29 is brought centrally along half-portion 11 with its outer conductor connected to respective transverse rods 33. Its inner conductor 28 exits from the coaxial line at the apex of portion 11 and connects to the apex of portion 10.

The antenna system of FIGURE 4 is similar to that shown in FIGURE 3 and like portions carry like reference numbers. However, in effect, angle $\beta$ is made zero in FIGURE 4 by not providing rods 41, 42, 43 and 44.

FIGURE 5 shows a modification of the antenna of FIGURE 4, wherein the trapezoidal teeth elements of FIGURE 4 are modified into triangular shapes. Thus, in FIGURE 5 the two antenna portions 10 and 11 are again confined within an angle $\alpha$; and like FIGURE 4, there is also provided a center rod 46 in portion 10 of FIGURE 5 and coaxial cable 29 along portion 11. In effect, items 46 and 29 are bisectors of angle $\alpha$.

Thus, in FIGURE 5, portion 10 is composed of transverse rods 51a, 51b through 51L. Similarly, portion 11 comprises transverse rods 53a, 53b through 53L. The rods connected at their ends to form transverse triangular teeth. The outer apex of each triangular tooth lies on a defining line of angle $\alpha$.

If the antenna of FIGURE 5 were superimposedl on a corresponding antenna of the type in FIGURE 1, the apexes of the triangular teeth of FIGURE 5 would be located on the lateral sides of corresponding trapezoidal teeth.

The positioning of the transverse rods in FIGURE 5 is preferably determined by means of expressions 1 and 2 given above. However, the terms of the expressions are preferably defined in FIGURE 5 with respect to the apex points of the transverse teeth. This is done with respect to antenna half-portion 10 by designating its apexes on the right-hand side in FIGURE 5 by means of R and by designating its apexes on the left-hand side by r. The dimensions R and r are measured from a transverse line 60 that passes through terminal point 12 and is transverse to center-line members 46 and 29. The end of each rod 51a and 53a farthest from point 12 is considered an apex, and each has a distance $R_1$ from line 60.

With this definition of the positions of the elements in FIGURE 5, it will be found that their points of intersection with center-line members 46 and 29 also satisfy expressions 1 and 2 above, with expression 3 being a specific case. Also, it will be noted that alternate elements in FIGURE 5 are parallel to each other; for example, elements 51a and 51c are parallel, 51b and 51d are parallel, and so forth.

In FIGURE 5, the apex part of portion 10 is defined by rods 56, 57 and 51L. Likewise, in portion 11 the apex triangle is defined by rods 58, 59 and 53L.

FIGURE 2 may also represent a side view of any FIGURES 3, 4 and 5, wherein their two half-portions are separated by an angle $\Psi$ which may vary from 0° to 180°.

The basic triangular-toothed configuration of FIGURE 5 leads to the greatest structural simplification in some cases over other forms of the invention, while maintaining the desired operating conditions. Thus, the configuration of FIGURE 5, as also do FIGURES 3 and 4, permits wire structures for very large antennas capable of having extreme broadbandedness which extends into the lower frequencies. In order to lower the low frequency limit of the antenna range, it is necessary to increase the size of the larger elements of the antenna. Since the width of the largest transverse element approximates one-half wavelength of the lowest frequency, it can be realized that at very low frequencies the transverse elements can become rather large.

FIGURES 6(A) and (B) illustrate how the antenna configuration given in FIGURE 5 can be constructed of wire. It is constructed using three poles 61, 62 and 63 firmly supported uprightly from the ground. Again the antenna comprises the two half-portions 10 and 11. A plural waisted insulator 64 is provided at the top of a pole 61 and is situated at the apex of the antenna. The poles are preferably wood so as not to interfere with the radiation. A pair of hooks 66 and 67 are respectively fastened in horizontal alignment to poles 62 and 63 near their top. Similarly, a second pair of hooks 68 and 69 are fastened with horizontal alignment to the lower portions of poles 62 and 63. A taunt line 71 is connected between hook 67 and the upper-middle waist of insulator 64. Line 71 consists of metal wire segments mechanically coupled but electrically separated by insulators 72. Similarly, another line segment 73 is connected between the upper-middle waist of insulator 64 and hook 66. Line 73 is likewise comprised of wire segments similarly coupled by insulators 72. Lines 71 and 73 are structural only and are interrupted electrically by the insulator to prevent them from having an antenna function. A dielectric type of structural line could preferably be used for lines 71 and 72 without insulators; however, no dielectric material is known which is properly stable under tension. The insulators 72 along lines 71 and 73 are positioned to support the apexes of the triangular teeth. Transverse wires 51a through 51L are positioned between the supporting lines 71 and 73 with an angle $\alpha$ in the manner defined for FIGURE 5. Insulators 72 connect to the apex of each transverse tooth along lines defining $\alpha$.

In a like manner, the lower half-portion 11 of the antenna is strung between a pair of structural lines 81 and 82, which correspond respectively to lines 71 and 73. Thus, lines 81 and 82 are strung between the lower-middle waist of insulator 64 and hooks 68 and 69, respectively. A central wire 46 connects the elements of section 10 along the bisector of angle $\alpha$. Similarly, a central wire 47 connects the transverse elements of antenna portion 11 to bisect its angle $\alpha$. Central lines 46 and 47 connect to the upper and lower waists of insulator 64.

A balanced transmission line 83 is brought along pole 61. It fans away from the antenna and then is brought directly toward its apex, where the opposite sides of the line respectively connect to the ends of leads 46 and 47. The directivity of the antenna system of FIGURES 6(A) and (B) is the direction of arrow 27 in FIGURE 6(A) and provides pattern 26 in that figure.

Where it is desired to make the antenna of FIGURE 6 have a symmetrical figure-eight pattern, angle $\psi$ should be 180°, and the entire antenna may be supported between two parallel upright poles in a manner which is obvious in view of the description of the antenna in FIGURE 6. A coaxial feed line is then preferably used, as given in the prior figures.

FIGURE 7 illustrates a rotatable single-mast mounting of the form of the invention shown in FIGURE 4, and like reference numbers are used for like components. The antenna system of FIGURE 7, for example, can be a radio-ham antenna which is preferably extremely broadband to receive many of the ham bands. Unlike other ham antennas, the one in FIGURE 7 does not require any tuning for the various bands, and furthermore it maintains a directivity which is constant for all bands within its range. Thus, if the antenna is designed for a fifteen-to-one range, it can provide a horizontally polarized transmission at various points in the spectrum between two and thirty megacycles. In FIGURE 7, the opposite halves of the antenna, 10 and 11, are supported on rotatable mast 86. The central members 46 and 47 of antenna portions 10 and 11 are step-tapered in cross-section, in order to enhance broadbandedness. The taper is largest at elements 32a and 33a and narrows to a point adjacent to the antenna apex. Also, in order to enhance broadbandedness the largest diameter rods are 32a and 33a; with the diameters of the rods decreasing as their positions approach the antenna apex.

Mast 86 can be made of conducting material, and when it is made of conducting material it should be connected to supports 46 and 47 at points midway between any two adjacent rods 32 or 33, respectively. It has been found experimentally that a metal mast does not interfere with the radiation pattern when it is connected to such mid-points, because it appears that voltage-null points exist along rods 46 and 47 at the points midway between adjacent transverse rods.

A coaxial transmission line 87 passes upwardly through mast 86, which is hollow, and passes outwardly through a hole 88 in the mast and has its outer conductor connected along central member 47 until it terminates at the apex of the antenna as taught with FIGURE 4. Thus, its center conductor 28 extends outwardly and connects to the end of central member 46. A dielectric block 89 connects the apex ends of half-portions 10 and 11 to provide mechanical rigidity only.

It has been found that the center-line conducting member 46 and 29 in FIGURES 4 and 5, and 46 and 47 in FIGURE 6 can be removed with some deterioration of broadbandedness but with substantial broadbandedness remaining. Then, balanced transmission lines are preferable, although a coaxial cable connected along the periphery of the teeth of one side to the apex could also be used to feed the antenna.

FIGURE 8 illustrates an omnidirectional form of the invention. With an oversimplification of statement which will be realized shortly, FIGURE 8 comprises two antennas of the type shown in FIGURE 1 positioned in space quadrature. The oversimplification referred to is that such two antennas do not have corresponding teeth. That is, the quadrature plane antennas have their teeth differently placed. A picturesque manner of describing the positioning of the teeth of each antenna half-portion 110 and 111 in FIGURE 8 is to say that the teeth of each provide a spiral staircase leading to the antenna terminal 112. The spiral effect is shown in FIGURE 9, which shows a logarithmic or equiangular spiral developed on a cone. Thus, one would have an antenna of the type in FIGURE 8 by passing two transverse planes 118 and 119 along the axis of the cones in FIGURE 9.

While theoretically the spiralling can extend to infinity, in practice, it must be finitely terminated. Thus in FIGURES 8 and 9, termination is defined by planes transversely intersecting the center-line of the half-portions 110 and 111 at points equally distant from terminal point 112.

FIGURE 10(A) shows an end view of the antenna of FIGURE 8, which provides an omnidirectional-type radiation pattern 91.

Half-portion 110 includes four radial members 121, 122, 123 and 124 shown in FIGURE 10(A), which are fastened together along the center-line of 113—114 that passes through both half-portions. In the same sense, there are two radial members on the opposite sides of center line 13 in FIGURE 1 to define half-portion 10. The same situation is found in each half-portion in each of FIGURES 1–9. A radial member thus is confined within an angle $$\frac{\alpha}{2}$$

from the center line of a half-portion. Similarly, half-portion 111 includes four radial members 131, 132, 133 and 134. Each radial member is included within an angle $$\frac{\alpha}{2}$$

from the antenna center line, as shown in FIGURE 8. In obtaining the spiral-staircase effect, the outer edge of any two adjacent spiral-related teeth, not being cut off by the bounding planes, such as 110c and 110d, have their respective outer sides defined by the expression:

$$\tau^{1/4} = \frac{R_{N+1}}{R_N} = \frac{r_{N+1}}{r_N} \qquad (4)$$

Hence, distances $R_N$ and $R_{N+1}$ in expression 4 from a transverse plane passing through a point 112 are given by $R_3$ and $R_4$ for teeth 110c and 110d. Similarly, $r_N$ and $r_{N+1}$ are taken from the inner sides of consecutive spiral teeth to satisfy expression 4. Also, the center-line distance $r_N$ and $R_N$ of the inner and outer sides of any tooth from point 112 will also have the fixed ratio given in expression 2 above, and the special case of expression 3 can likewise be satisfied.

Antenna portion 111 is formed in the same manner as portion 110 except that the spiralling goes in reversed directions for the respective half-portions 110 and 111 looking from terminal point 112. Nevertheless, portion 111 is twisted 180° with respect to portion 110 about their center-line. Thus, tooth 110b corresponds to 111b, tooth 110c corresponds to tooth 111c, etc., with corresponding teeth being on opposite sides of the common center-line.

Due to the 180° reversal about the center-line of antenna half-portions 110 and 111 with respect to each other, the two half-portions are not antenna images of one another. Accordingly, one half-portion cannot be provided over a transverse ground-plane through point 112 to obtain the same omnidirectional-type response which is obtained with the two half-portions disposed as shown.

Figure 10B:
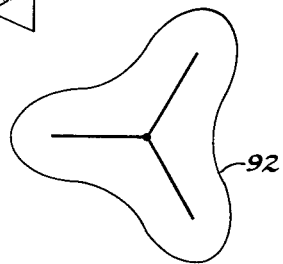
Figure 10C:
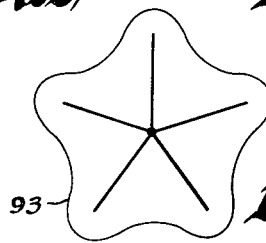

Although there are four radial members used in each half-portion of FIGURE 8, actually any number greater than two can be used, and the same rules apply for proportioning adjacent teeth in the spiral-staircase manner. The dimensions of an antenna having $m$ number of radial members per half-portion can be found as follows:

$$\tau^{\frac{1}{m}} = \frac{R_{N+1}}{R_N} = \frac{r_{N+1}}{r_N} \qquad (5)$$

Where three radial members are used in each half-portion, an end view is shown in FIGURE 10(B). Extending the rationale to five radial members per half-portion, an end view is given by FIGURE 10(C). This can be extended to any number $m$ of radial members with the ultimate limit being the spiral-grooved cones of FIGURE 9 as the number $m$ approaches infinity.

The omnidirectional-type patterns such as patterns 91, 92 and 93 in FIGURES 10(A), (B) and (C) are slightly distorted according to the number of radial members used per antenna portion. However, this deviation from a perfect omnidirectionality is generally small and not objectionable in practice, while at times has definite advantages.

FIGURE 11 is basically the same as FIGURE 8 except that it is made of wire network which simplifies construction in many cases. Thus, the individual radial sections of FIGURE 11 are outlined by wire to form the toothed-configuration of FIGURE 8. The transverse rods in FIGURE 11 do not intersect the coaxial cable 114, but merely fasten to its outer conductor. In practice, the rods are continuous and coaxial line 114 and center-rod 113 lie in a corner of their cross-over planes. The center-conductor 128 connects to the apex end of rod 113, which can be a solid conducting rod.

The antenna network of FIGURE 12 is a triangular-toothed version of the form in FIGURE 11 and has similarities to FIGURE 5. Accordingly, the variation from 11 and 12 is similar to the variations from FIGURES 4 to 5.

In regard to the three-dimensional structures given in FIGURES 8 through 12, it was stated above that opposite half-portions are not images. However, when the entire antenna assembly having both halves is erected over a ground plane, the image of the entire antenna is view in the ground plane and this does not interfere with the radiation pattern.

Figure 14B:
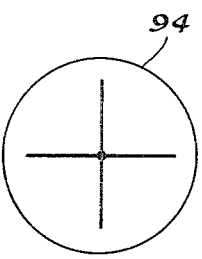

FIGURE 14(A) illustrates a rounded-tooth version of the form of the invention given in FIGURE 8. FIGURE 14(A) differs from FIGURE 8 in that in FIGURE 14(A) the edge of each tooth is a segment of a circle about terminal point 112. Thus, dimensions $R_N$ and $r_N$ in FIGURE 14(A) are taken from point 112 of the antenna to any point along a respective tooth edge. An improvement in the omnidirectionality of the radiation pattern was found in the rounded-toothed version of FIGURE 14(A) over the previously straight-toothed version of FIGURES 8, 11 and 12. Thus, the circular radiation pattern 94 shown in FIGURE 14(B) is obtained about an end view of the antenna given in FIGURE 13(A).

FIGURE 13 illustrates a modified version of FIGURE 1. Unlike FIGURE 1, where all the teeth have their inner and outer edges perpendicular to center-lines 13 and 14, the teeth in FIGURE 14 have their outer and inner sides 22 and 21 intersect center-lines 14 and 13 at an angle $\delta$. The points of intersection of the tooth edges with the center line are determined in the same manner as was given for FIGURE 1. That is, the points of intersection are determined by expressions 1 and 2 above. Otherwise the antenna in FIGURE 14 is the same as that shown in FIGURE 1, and a corresponding radiation pattern is obtained. The angle $\delta$ may be proportioned as desired, but better performance is taken if the teeth drop toward terminal point 12.

FIGURE 15 illustrates the forward radiation lobe of the antenna. There will also be a backward lobe, not shown here. The backward lobe is equal to the forward lobe only when angle $\psi$ is 180°. As $\psi$ decreases, the backward lobe decreases, and accordingly the front-to-back intensity ratio increases. Thus, by making $\psi$ small, the back lobe is made minor in comparison to the forward lobe, and can be made to have an intensity of twenty or thirty decibels below that of the forward lobe.

Antenna 150 in FIGURE 15 is illustrated with respect to $x$, $y$ and $z$ coordinate axes. These axes intersect at the apex terminal point 12 of antenna 150. Thus, axis $x$ aligns centrally with the entire antenna structure to bisect angle $\psi$. Axis $y$ is parallel to the transverse rods of the antenna, which is of the type shown in FIGURE 4. The radiation E-vector is parallel to the $y$ axis. Accordingly the $xy$ plane will be called the E-plane. Furthermore, the radiation H-vector is parallel to the $z$ axis, and the $xz$ plane is called the H-plane.

When angle $\psi$ is decreased from 180° toward zero with all other parameters remaining constant, the beam-width 151 of the E-plane pattern remains substantially fixed. However, the beam-width 152 of the H-plane pattern increases in beam-width. Furthermore, the front-to-back ratio increases. The H-plane variation is a first order effect with variataion of $\psi$.

When angle $\alpha$ is decreased with all other parameters remaining constant including angle $\psi$, there is a small second-order decrease in E-plane beam-width 151. However, there is a first-order decrease in H-plane beam-width 152. Nevertheless, there is a practical limit to decreasing angle $\alpha$ without increasing $\tau$. The limit can be specified approximately by referring to a parameter $\epsilon$ which relates tooth width S to tooth length L, shown in FIGURE 15, according to the following expression:

$$\epsilon = \frac{S}{L} \qquad (6)$$

It has been found desirable to maintain $\epsilon$ equal to or less than 0.6.

If the tooth-spacing ratio $\tau$ of expression 1 above is increased while all other parameters remain fixed, the number of teeth, of course, increases for a given sized antenna. As a consequence, both beam-widths 151 and 152 in the E and H-planes, respectively, decrease in a small corresponding amount, which is a second-order effect.

Although this invention has been described with respect to particular embodiments thereof, it is not to be so limited as changes and modifications may be made therein which are within the full intended scope of the invention as defined by the appended claims.

We claim:

1. A straight-toothed logarithmically periodic antenna comprising two half-portions, each comprising two opposite radial members connected along the central part of their half-portion, the two half-portions bounding a solid angle $\psi$ and being generally triangular in shape and having adjacent apexes, each of said radial members being bounded by an apex angle $$\frac{\alpha}{2}$$

from a line along the central part of either half-portion, first and second center-conducting members respectively extending from the apexes to the ends of the respective half-portions along their central parts, each half-portion having a plurality of rods cross-connected to its center-conducting member and terminated by the bounds of its angle $$\frac{\alpha}{2}$$

connecting means provided at the ends of said transverse rods along the outer boundaries of each angle $$\frac{\alpha}{2}$$

of each radial member, respective teeth closed by said connecting means, the connecting means on opposite radial members of each half-portion being staggered with respect to each other, the distances along a radial from the apex of said transverse rods of each radial member being a geometric sequence, and a transmission line having opposite sides connected to the respective apexes of said two half-portions.

2. An antenna as defined in claim 1 in which the diameters of said rods are proportioned to their distance from their apex.

3. An antenna as defined in claim 1 in which alternate rods of each half-portion are parallel.

4. An antenna as defined in claim 1 in which both antenna half-portions and their radial members lie in the same plane.

5. An antenna as defined in claim 1 in which a plurality of rod portions comprise said connecting means, with said rod portions of each radial member being aligned.

6. A triangular-toothed logarithmically periodic antenna comprising opposite antenna half-portions, each half-portion being in a respective plane and having a generally-triangular shape, said half-portions having adjacent apexes and being bounded by a respective apex plane-angle $\alpha$, the respective planes being oriented by a solid-angle $\psi$, a respective conducting center-member provided with each half-portion and positioned along the bisector of its angle $\alpha$, a plurality of rods connected across said center-member of each half-portion, adjacent rods connected at their ends along the boundaries of angle $\alpha$ and there terminated, alternate rods being parallel, the distances from the apex of each half-portion to the opposite ends of each of its rods having a geometric-sequence ratio $\sigma$.

7. A three-dimensional straight-toothed logarithmically periodic antenna comprising two opposite half-portions which are aligned along the same center-line, each half-portion triangularly tapering to an apex, with the apexes of both half-portions being closely adjacent, a transmission-line having opposite sides connected to the respective apexes, each half-portion having more than two radial-toothed members symmetrically connected along said center-line, the teeth of each member extending outwardly from the center-line of its half-portion, each radial member having an apex angle $$\frac{\alpha}{2}$$

with respect to its center-line, the teeth of said radial members of each half-section aligned along a conical logarithmic spiral beginning at the respective apex of each half section.

8. A three-dimensional periodic antenna as defined in claim 7 in which the thickness of the radial sections increases linearly from the apex of each antenna half-portion.

9. A three-dimensional periodic antenna as defined in claim 7 in which said teeth are formed of rods located along the periphery of said teeth, a respective center rod positioned along the center-line of each of said half-portions and connected to transverse ones of the rods forming said teeth.

10. A three-dimensional logarithmically periodic antenna comprising a pair of half-portions aligned along a common center-line, each half-portion formed in the same manner as the other but one rotated 180° about the center-line with respect to the other, each half-portion having an apex, with the apexes being closely adjacent, a respective center member of each half-portion passing along its center-line, more than two radial members provided in each half-portion and being symmetrically disposed around their center-line, each radial member having a triangular shape and a common apex, each radial member bounded by an apex angle of $$\frac{\alpha}{2}$$

measured from the center-line, a transmission-line having opposite sides connected respectively to the apexes of said antenna half-portions, each radial member comprising a plurality of triangular teeth positioned transversely from said center-line, each of said teeth having its outer side bounded by angle $$\frac{\alpha}{2}$$

the teeth of the radial members of any one half-portion arranged along a conical logarithmic spiral from the apex of the half-portion.

11. A triangular-toothed three-dimensional antenna as defined in claim 10 in which each of said antenna half-portions is formed from wire aligned with the periphery of said teeth, a central wire being provided along the center-line of each of said half-portions and connecting to the wires forming its teeth that cross said center-line.

12. An antenna as defined in claim 11 in which four radial members are provided for each antenna half-portion.

13. A three-dimensional rounded-toothed logarithmically periodic antenna comprising two half-portions symmetrically aligned about a center-line passing through said antenna, with each half-portion having an apex, and said apexes being closely adjacent although separated from one another, a transmission line having opposite sides connected to the respective apexes, a plurality of more than two radial members comprising each half-section, each radial member being generally triangular in shape and having an apex at the apex of its antenna half-portion, with each radial member having an apex angle of $$\frac{\alpha}{2}$$

a plurality of teeth formed in each radial member, with each tooth having inner and outer sides which are circular about its apex as a center, the teeth of each half-portion arranged to form a conical logarithmic spiral from its apex, the distances of adjacent sides of adjacent spiral teeth having a fixed ratio $\tau$, the opposite antenna half-portions being formed in the same manner but being rotated 180° with respect to each other about the center-line.

14. A curved-tooth three-dimensional antenna as defined in claim 13 in which each half-portion includes four symmetrically placed radial members.

References Cited in the file of this patent

UNITED STATES PATENTS

| 2,480,154 | Masters | Aug. 30, 1949 |
| 2,656,463 | Woodward | Oct. 20, 1953 |
| 2,712,602 | Hallen | July 5, 1955 |
| 2,737,656 | Cumming | Mar. 6, 1956 |
| 2,780,808 | Middlemark | Feb. 5, 1957 |

OTHER REFERENCES

"Broadband Logarithmically Periodic Antenna Structures," by DuHamel and Isbell, 1957 IRE National Convention Record, Part I, pages 118–128, March 18, 1957.

"Frequency Independent Antennas," by Rumsey IRE Convention Record, Part I, pages 118–128, March 18, 1957.

"Logarithmically Periodic Antenna Designs," by DuHamel & Ore 1958 IRE National Convention Record, Part I, (March 1958), page 140.

Book, Very High Frequency Techniques, complied by Radio Research Laboratory of Harvard U., McGraw-Hill, 1947, vol. 1, pages 2 and 3 relied upon.